United States Patent
Wright, Jr.

(10) Patent No.: US 9,892,440 B2
(45) Date of Patent: Feb. 13, 2018

(54) METHOD OF COMPARING PRODUCT-IDENTIFYING SERIAL CODES

(71) Applicant: Michael R. Wright, Jr., Stilwell, KS (US)

(72) Inventor: Michael R. Wright, Jr., Stilwell, KS (US)

(*) Notice: Subject to any disclaimer, the term of this patent is extended or adjusted under 35 U.S.C. 154(b) by 376 days.

(21) Appl. No.: 14/663,424

(22) Filed: Mar. 19, 2015

(65) Prior Publication Data

US 2015/0269581 A1    Sep. 24, 2015

Related U.S. Application Data

(60) Provisional application No. 61/955,501, filed on Mar. 19, 2014.

(51) Int. Cl.
| | |
|---|---|
| *G06K 5/00* | (2006.01) |
| *G06Q 30/06* | (2012.01) |
| *G06Q 10/08* | (2012.01) |
| *G06F 17/30* | (2006.01) |
| *G06F 21/32* | (2013.01) |
| *G06F 21/35* | (2013.01) |

(52) U.S. Cl.
CPC ... *G06Q 30/0609* (2013.01); *G06F 17/30477* (2013.01); *G06F 21/32* (2013.01); *G06F 21/35* (2013.01); *G06Q 10/087* (2013.01); *G06F 2221/2107* (2013.01); *G06Q 2220/00* (2013.01)

(58) Field of Classification Search
CPC ........ G07F 7/1008; G07F 7/08; G06Q 20/341
USPC ......................................................... 235/380
See application file for complete search history.

(56) References Cited

U.S. PATENT DOCUMENTS

| 8,229,861 | B1* | 7/2012 | Trandal | G06Q 30/012 |
| | | | | 705/26.1 |
| 2002/0133425 | A1* | 9/2002 | Pederson | G06Q 30/012 |
| | | | | 705/26.1 |
| 2010/0235290 | A1* | 9/2010 | Junger | G06Q 10/0833 |
| | | | | 705/304 |
| 2014/0122275 | A1* | 5/2014 | Argue | G06Q 20/0453 |
| | | | | 705/24 |

* cited by examiner

*Primary Examiner* — Ahshik Kim

(57) ABSTRACT

A process for protecting against fraudulent transactions entails comparing a first serial code with a second serial code, as well as comparing a first user identification with a second user identification. An additional comparison between a first stock keeping unit code and a second stock keeping unit code can also be made. If any of the compared data items do not match, then a notice of denial is issued for the transaction. Exceptions can be made, for example by comparing a first listing timestamp with a second listing timestamp to determine that a second transaction is occurring within a defined time period such as a return period. Data is recognized by an optical reader utilizing optical character recognition, with read data being saved to a data record. Serial codes can be directly printed on products or instead applied as a tamper evident sticker.

16 Claims, 15 Drawing Sheets

METHOD OF COMPARING PRODUCT-IDENTIFYING SERIAL CODES

The current application claims a priority to the U.S. Provisional Patent application Ser. No. 61/955,501 filed on Mar. 19, 2014.

FIELD OF THE INVENTION

The present invention relates generally to product transaction security. More specifically, the present invention is a method, which compares data during product transactions and alerts either whenever a product-identifying serial code is identified as being used outside of its scope of use or if a product has had an identifier tampered with. Alerts can include but are not limited to, misuse of returns and counterfeit identification. In misuse of returns, the present invention allows a seller to identify an item the purchaser is returning as either modified or as an item that is materially different than that of the item that was originally purchased. In a scenario of a seller offering counterfeit items, the present invention prevents a seller from using the invention to sell multiple items with the same serial numbers and sends an alert that the seller is attempting to sell an item with an identification number that has not been cleared for use in the system.

BACKGROUND OF THE INVENTION

This invention provides a series of identification tools that can help reduce improper or even fraudulent product returns. Retailers often lose revenue due to the misuse of return policies and subsequently pass lost revenue back to the customer in the form of price increases. These issues can be addressed by either capturing or affixing unique alphanumerical codes to product that are sold using the invention and subsequently assigning unique seller account identification code to each user, i.e. a "user identification" while maintaining a database of the transactions of each of the products identification codes and the identification of the user offering the sale of the product. A mechanism is then provided to store these identification codes and the identifications of the user submitting the code attached to the product whenever a transaction occurs.

The system can evaluate a return transaction (e.g. such as a purchaser returning a product to a seller) by comparing its identification code to the product code, entered into the system, prior to the sale of the product to the purchaser. The system will alert the user who is entering the product description with a notice of approval as long as there are no discrepancies with the product identification code. Discrepancies can be set as policies where the system can accept or reject the placement of the product into the sales management system, as well as reject the authorization of the product return based upon the policies set by the sales administrator.

Policies can be set to include mismatching identification codes, tampered with products, or materially different products that have had identifiers removed by the purchaser prior to returning the product to the seller. Additional information, including a stock keeping unit code, a listing timestamp, and a product photo can be employed for making additional comparisons which help to further identify potential misuse of return policies.

It is therefore an object of the present invention to utilize and compare product-associated information in order to evaluate transactions to ensure that marketplace return policies are not being violated.

DETAIL DESCRIPTIONS OF THE INVENTION

Figure 1:
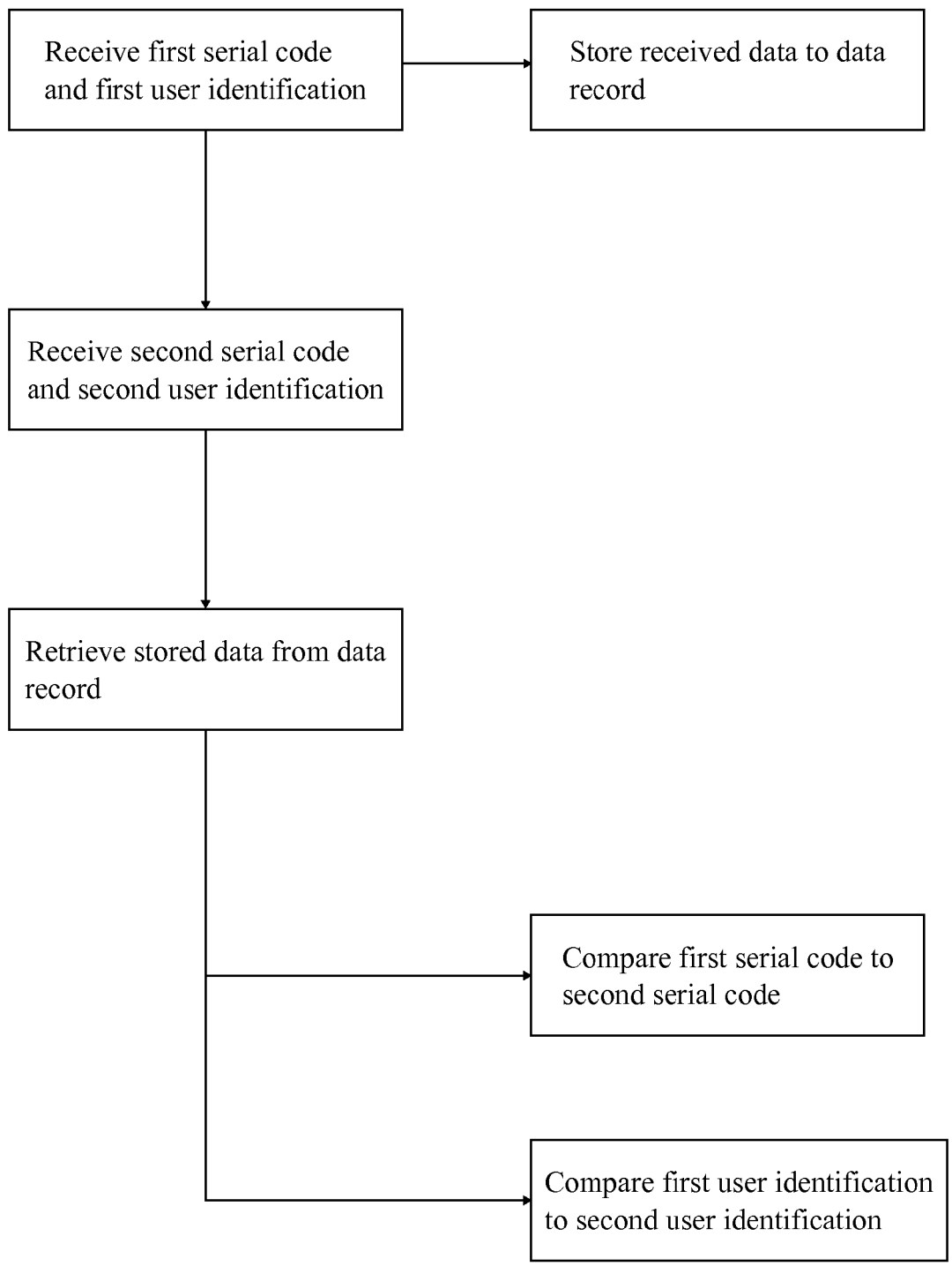
FIG. 1 is a flowchart illustrating the process of receiving and comparing serial codes and user identifications, as related to the present invention.

All illustrations of the drawings are for the purpose of describing selected versions of the present invention and are not intended to limit the scope of the present invention.

The present invention is a method provided to protect sellers from individuals who attempt to misuse marketplace return policies by attempting to return materially different products by comparing a first serial code 11 to a second serial code 12. The present invention is applicable to numerous situations that include misuse of marketplace return policies and the sale of potentially counterfeit products. The present invention may be provided as an application programming interface (API) which can be integrated into third-party marketplace sales management programs by third-parties or alternatively be provided as a standalone executable application package. The present invention is a method of comparing product-identifying serial codes for the purpose of detecting violations of policies set by the Applications administrator, by executing computer-executable instructions stored on a non-transitory computer-readable medium. The instructions are executed by generally a computer wherein the computer may be, but not limited to, a local personal computer, a local server computer, a server computer offsite, otherwise known as server side executable, or any other computing device capable of executing the method instructions of the present invention.

Outlining the present invention, a computer executing computer-executable instructions stored on a non-transitory computer-readable medium receives information relating to a product transaction, which includes the product being sold, returned, or being transferred to a different vendor. At the first transaction, the computer receives a first serial code 11 and a first user identification 21, both of which are stored in a data record 31. The data record is any reasonable format for data storage, stored or any reasonable non-transitory computer-readable medium, and may be, but not limited to, a hypertext data file, a table file, or a database file. The data record 31 comprises the first serial code 11 and a first user identification 21 and groups these two stored values together. In an example of storing the data record in a database, the data record comprising the first the first serial code 11 and a first user identification 21 are stored as one row within a table of the database record, further having one unique primary key for further data retrieval and query. If and when the data record 31 is retrieved or queried, the first serial code 11 and a first user identification 21 are retrieved together so that the first serial code 11 corresponds with the first user identification 21. For example, if the data record 31 is retrieved, the computer recognizes that the first serial code 11 corresponds with the first user identification 21. Notwithstanding, a plurality of data records 31 will ultimately be created by the present invention as each unique commerce transaction will result in a new data record 31 wherein the data record 31 for each new transaction containing a first serial code 11 and a first user identification 21 received by the computer of the present invention. For example, in each instance a seller lists a product for sale within a sales marketplace platform, the computer will receive at least, a first serial code 11 and a first user identification 21. As commerce commences over time, the computer will retain a plurality of data records 31 for the plurality of commerce transactions wherein the data records 31 are stored on a non-transitory computer-readable medium, whether as individual hypertext data files, tables, databases, records stored within tables, records stored within tables of databases, or any other reasonable format for data retention. The storage of the first serial code 11 and associated first user identification 21 keeps track of each commerce transaction. Specifically, which user, through the first user identification 21, has listed what unique product item, through the first serial code 11. As each of the first serial codes 11 are unique to each individual physical product, even when two physical products are of the same make and model, the computer recognizes which specific item has been listed by the specific user associated with the first user identification 21.

After receiving the first serial code 11 and the first user identification 21, the computer will eventually receive a second serial code 12 and a second user identification 22. The second serial code 12 and the second user identification 22 represents a commerce transaction that follows the commerce transaction which allowed the receiving of the first serial code 11 and the first user identification 21. The methods for receiving the second serial code 12 and the second user identification 22 are the same as that of receiving the first serial code 11 and the first user identification 21. Upon receiving the second serial code 12 and the second user identification 21, the computer of the present invention retrieves the data record 31 containing the first serial code 11 and the first user identification 21. Depending on the storage format of the data record 31, the retrieval may be performed by accessing the saved data record 31 or querying the data record 31 from an applicable table or database.

Figure 2:
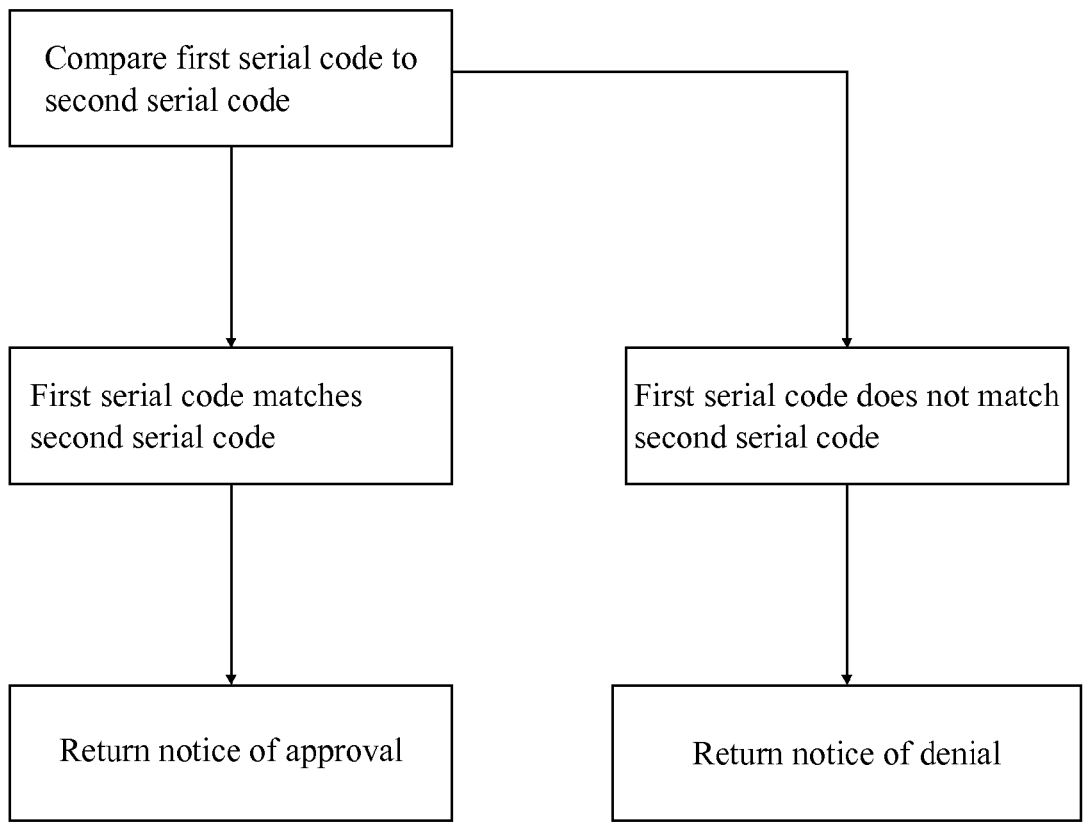
FIG. 2 is a flowchart further defining the process of comparing serial codes, as related to the present invention.

In a scenario of determining misuse of a product return policy, the computer queries the specific data record 31 containing the first serial code 11 and the first user identification 21. Or, if there are multiple data records 31 having the first user identification 21 which matches the second user identification 22, the computer will query and retrieve all data records 31 having the first user identification 21. Following, the computer of the present invention compares the first serial code 11 to the second serial code 12 and further the first user identification 11 to the second user identification 22. For all data records 31 where the first user identification 11 matches the second user identification 21, the computer will compare the first serial code 11 to the second serial code 12. If the first serial code 11 matches the second serial code 12, the computer will return a notice of approval 51. If the first serial code 11 does not match the second serial code 12, the computer will return a notice of denial 52. In a scenario where there are multiple data records 31 having the first user identification 21 match the second user identification 22, the computer need only one first serial code 11 to match one second serial code 12 to return a notice of approval 51. By matching one first serial code 11 to one second serial code 12, the system confirms that the person making the return has complied with the return policies and the same unique item is now subsequently being returned. This conclusion is drawn because the first serial code 11 matches the second serial code 12 received to indicate the same physical unique item was used to receive both the first serial code 11 and the second serial code 12. Furthermore, the first user identification 21 matches the second user identification 22 to indicate that the same person made the original purchase resulting in the receiving of the first user identification 21 stored in the data record 31 as the person who is now returning the item resulting in the receiving of the second user identification 22. Therefore, such a return is an attempt to violate the return policy as the same buyer has bought the same item that the same buyer is now attempting to return and this commerce action should be allowed. If there exists more than two data records 31 generated through multiple commerce events over time, the conditional logic for returning approval 51 or denial 52 will be for looped until the first serial code 11 and the first user identification 21 of each data record 31 is compared to the second serial code 21 and the second user identification 22, respectively. The steps are outlined in FIG. 1-FIG. 2.

Figure 3:
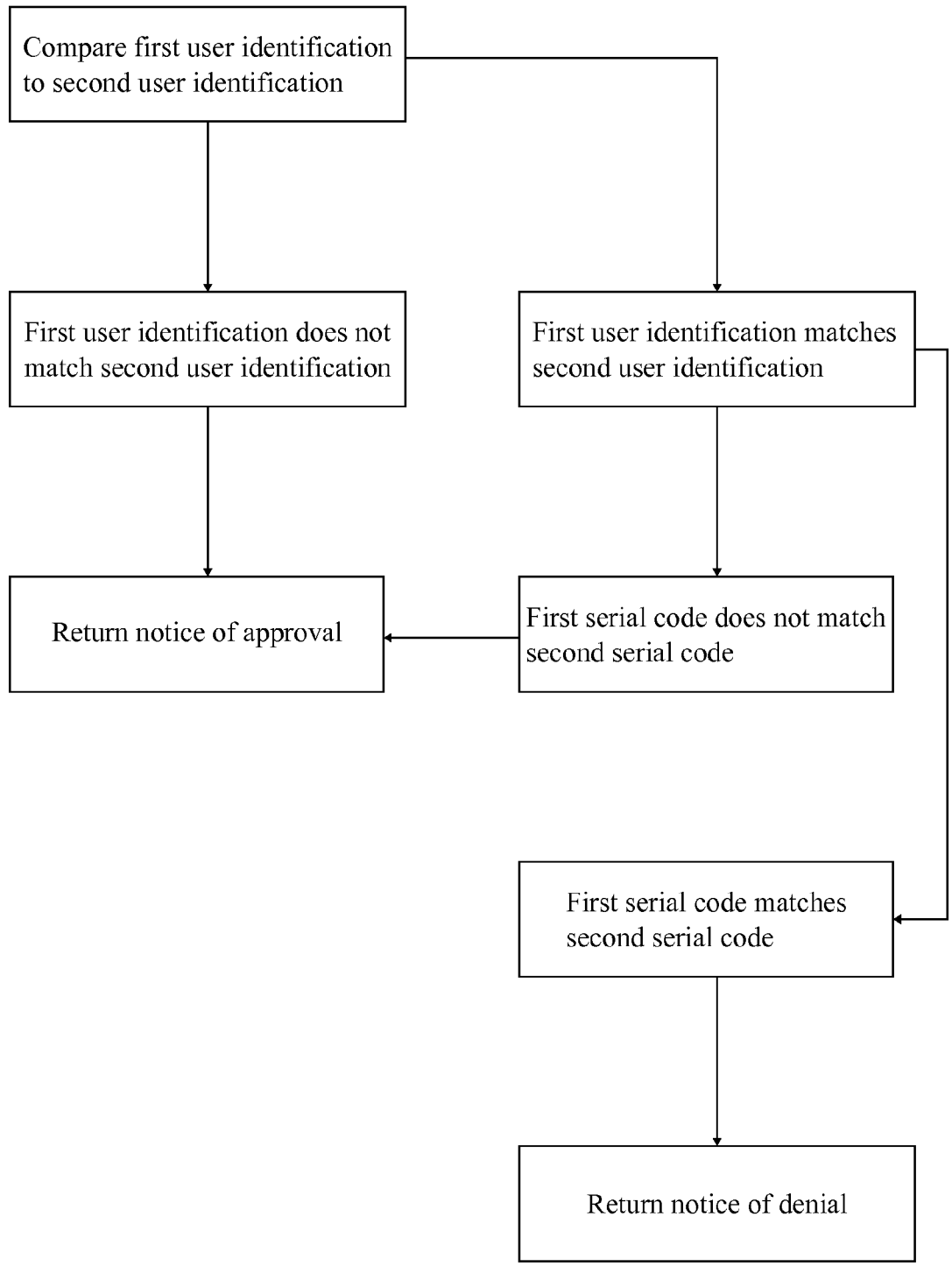
FIG. 3 is a flowchart further defining the process of comparing user identifications, as related to the present invention.

In a scenario of determining the attempt to distribute counterfeit or unauthorized products by the seller, the computer queries the specific data record 31 containing the first serial code 11 and the first user identification 21. Following, the computer of the present invention compares the first serial code 11 to the second serial code 12 and further the first user identification 11 to the second user identification 22. If the first user identification 21 matches the second user identification 22 and the first serial code 11 matches the second serial code 12, the computer returns a notice of denial and further prevents the product in question to be listed within the sale marketplace management system. 52. If the first user identification 21 matches the second user identification 22 and the first serial code 11 does not match the second serial code 12, the computer returns a notice of approval and allows the administrator to continue listing the product within the marketplace management system. 51. If the first user identification 21 does not match the second user identification 22 and the first serial code 11 matches the second serial code 12, the computer returns a notice of approval 51. If the first user identification 21 does not match the second user identification 22 and the first serial code 11 does not match the second serial code 12, the computer returns a notice of approval 51. Consolidating the last two conditional logics, if the first user identification 21 does not match the second user identification 22, the computer returns a notice of approval 51. If there exists more than two data records 31 generated through multiple commerce events over time, the conditional logic for returning approval 51 or denial 52 will be for looped until the first serial code 11 and the first user identification 21 of each data record 31 is compared to the second serial code 21 and the second user identification 22, respectively. The steps are outlined in FIG. 1-FIG. 3.

Figure 4:
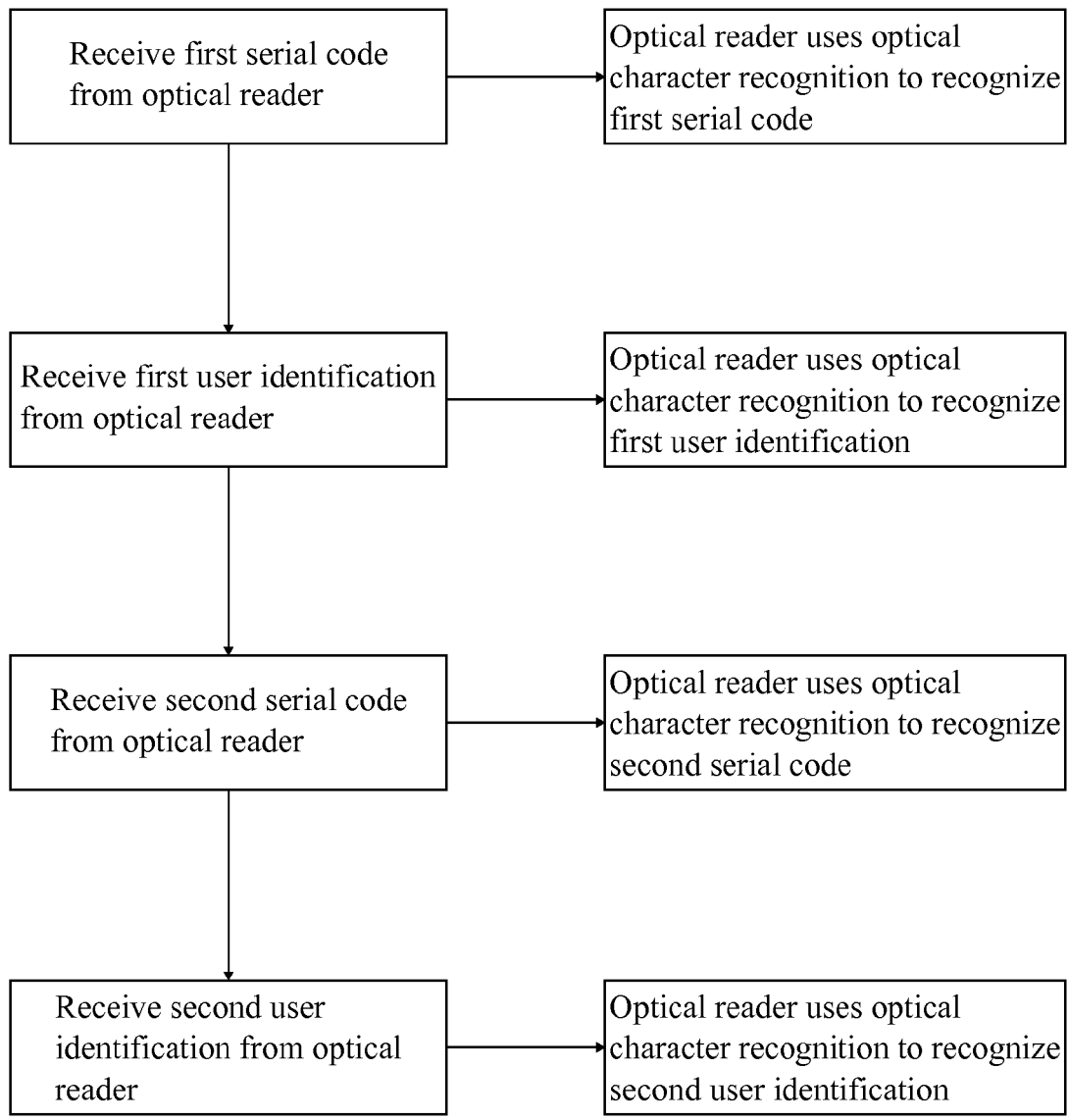
FIG. 4 is a flowchart illustrating how data is received from optical readers via optical character recognition, as related to the present invention.

The serial codes and the user identifications can be acquired and supplied to the computer through a number of means. One input method is the use of an optical reader 41 to obtain the serial codes and the user identifications, with the optical reader 41 employing optical character recognition (OCR). Through the optical character recognition program, the serial codes and user identifications can be read, allowing the computer running the marketplace management software to receive the serial codes and user identifications from the optical reader 41. The use of an optical reader 41, from which data is received, is illustrated in FIG. 4. In alternatives, the optical reader may be any reasonable digital reader, including but not limited to, cameras, infrared readers, barcode readers, or other suitable readers for converting visual data into binary data for computer computation and storage. Typical identification serial codes can include preprinted serial numbers and characters etched or adhered to the product being scanned.

In any of the aforementioned scenarios in which the computer returns a notice of denial 52, the user is instructed to contact a customer service unit that can explain the notice of denial 52 and assist the user with fixing the issues that resulted in the notice of denial 52 being issued.

For the scenario of preventing unauthorized product sales, the notice of denial 52 is returned in order to prevent reuse of a serial code by the same user. This prevents a number of undesirable situations, two examples including a seller attempting to sell the same product twice or a seller accidentally reusing the same serial code for two separate products. It is noted that this comparison does not preclude the resale of products, as long as the resale is done by a different user, e.g. when the received first user identification 21 does not match the received second user identification 22.

In some instances, it may be desirable to allow a serial code to be reused by the same seller. An example of such an instance includes a seller selling a product after a consumer has returned the product; even though the original seller rather than a new seller is reselling the product, it is not an unauthorized resale.

Figure 5:
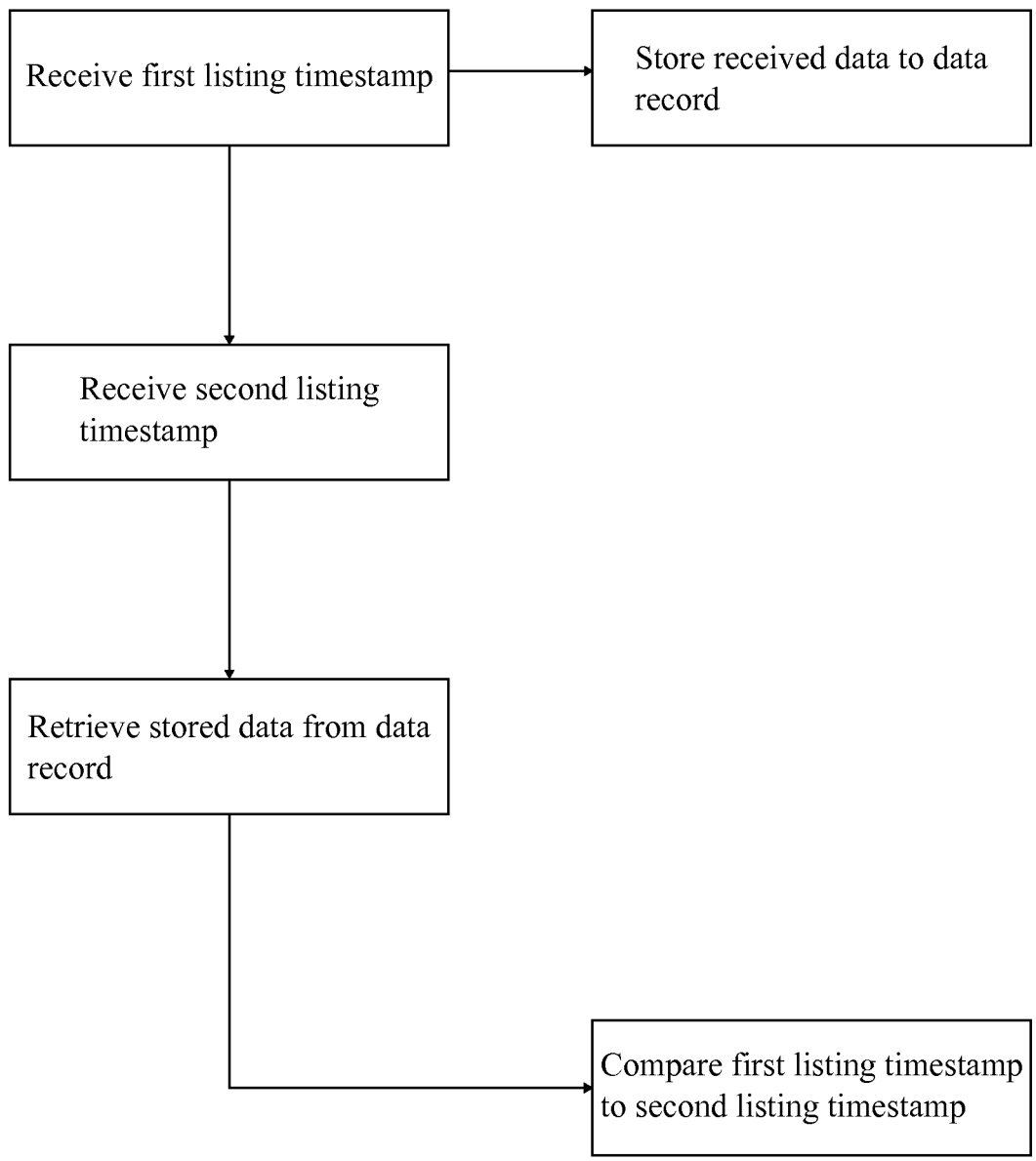
FIG. 5 is a flowchart illustrating the process of receiving and comparing listing timestamps, as related to the present invention.
Figure 6:
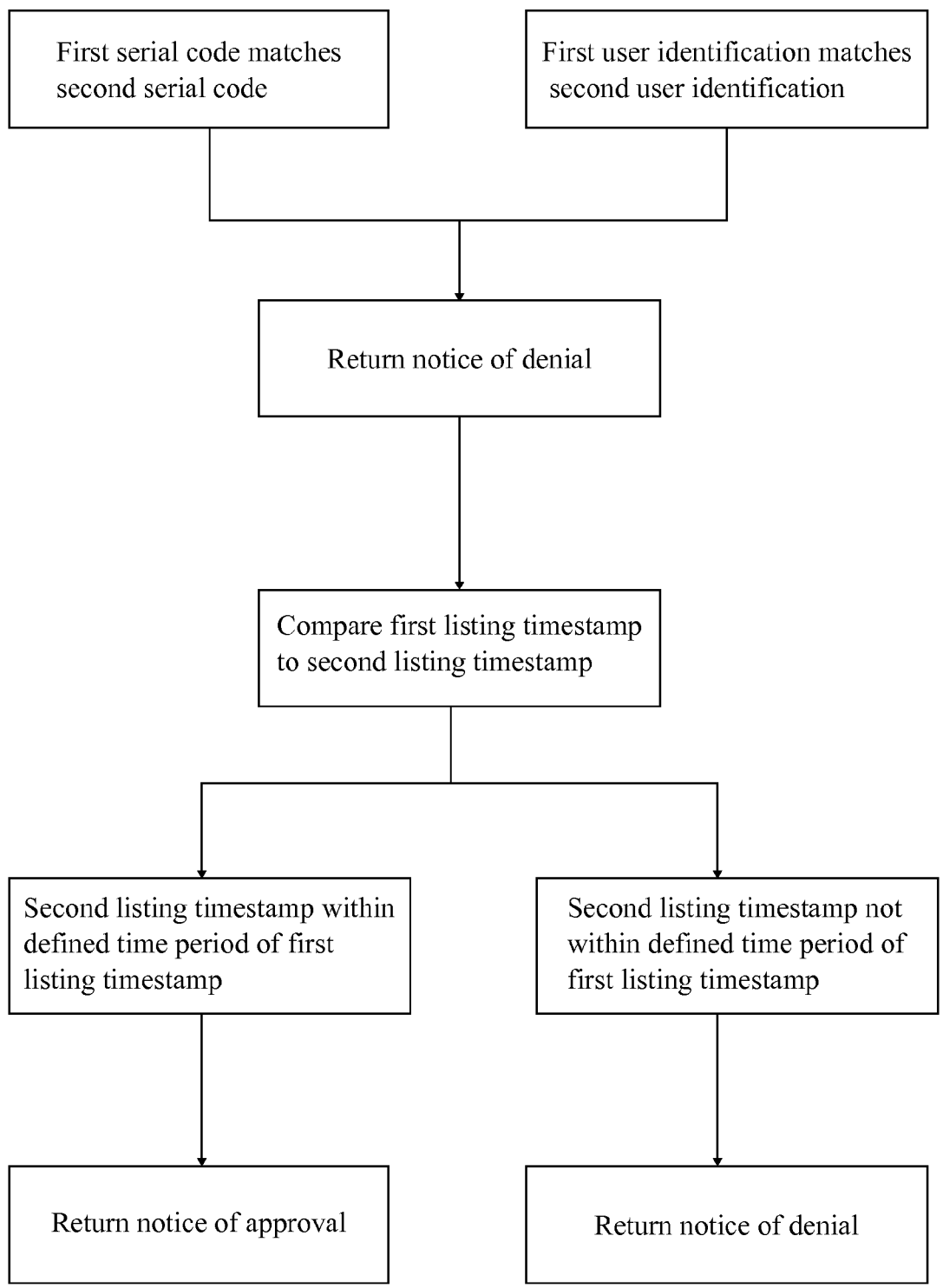
FIG. 6 is a flowchart further defining the process of comparing listing timestamps, in conjunction with comparing user identifications, as related to the present invention.

The present invention accommodates situations like the aforementioned by receiving, storing, and comparing listing timestamps which are tied to a specific data record 31 (along with a serial code and user identification). Describing the accommodation in more detail, the computer receives a first listing timestamp 61 which is stored in a data record 31 that also is storing the first serial code 11 and the first user identification 21. The computer then, upon receiving a second listing timestamp 62, compares the first listing timestamp 61 to the second listing timestamp 62. If the comparison turns up certain results, the computer will override a notice of denial 52, such as is returned when compared serial codes match and compared user identifications match. Reception and storage of the timestamps is detailed in FIG. 5, while FIG. 6 shows the results of comparing two timestamps.

The computer determines whether a notice of approval 51 or a notice of denial 52 is issued by comparing the time difference between the first listing timestamp 61 and the second listing timestamp 62. If the second listing timestamp 62 is within a defined time period 63 of the first listing timestamp 61, then the computer returns a notice of approval 51. Otherwise, if the second listing timestamp 62 is not within a defined time period 63 of the first listing timestamp 61, the computer returns a notice of denial 52.

The value used for the defined time period 63 can be based off a number of factors, one example of such including a return period of 30 days. Effectively, the previously described step allows a serial code associated with a user identification to be reused within a return period, rather than forcing a seller to use new serial codes every time a product is legitimately returned.

It is noted that a comparison of timestamps is only necessary if a notice of denial 52 would be issued due to matching serial codes and user identifications. If the first serial code 11 does not match the second serial code 12 or the first user identification 21 does not match the second user identification 22, a notice of approval 51 would be returned. Thus there is no need to compare a first listing timestamp 61 and a second listing timestamp 62; timestamps are only compared in order to confirm or override a notice of denial 52 as previously described.

In addition to the first serial code 11, first user identification 21, second serial code 12, and second user identification 22, a first stocking keeping unit code and a second stock keeping unit code 72 may be received by computer. These stock keeping unit codes provide an additional measure of security by providing an additional means of identifying a produce. When the first stock keeping unit code 71 is received, it is stored in the data record 31 along with a first serial code 11 and a first user identification 21. When a second stock keeping unit code 72 is received, the computer retrieves the data record 31 in order to access the first stock keeping code. The computer can then compare the first stock keeping unit code 71 to the second stock keeping unit code 72.

Figure 7:
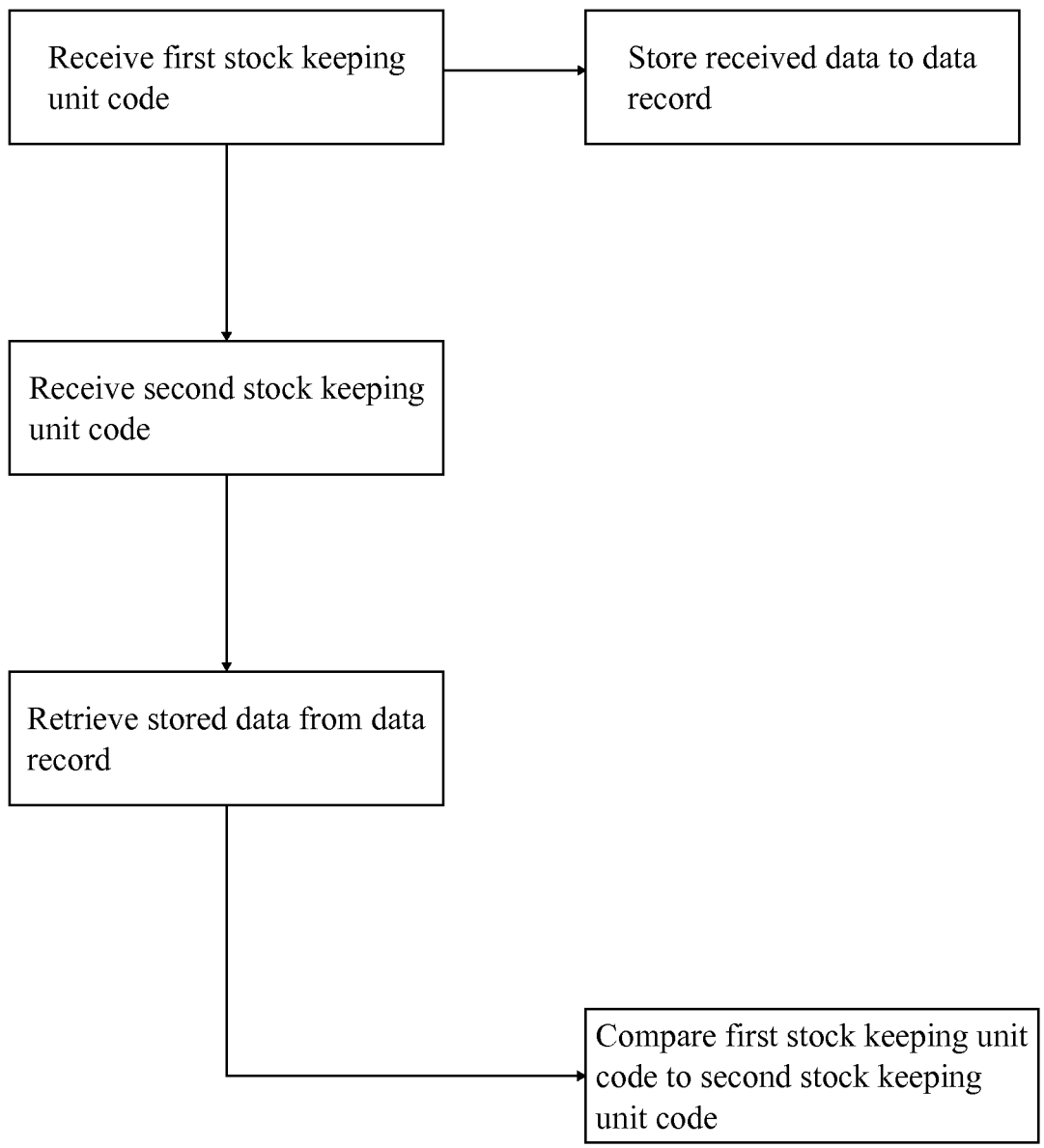
FIG. 7 is a flowchart illustrating the process of receiving and comparing stock keeping unit codes, as related to the present invention.
Figure 8:
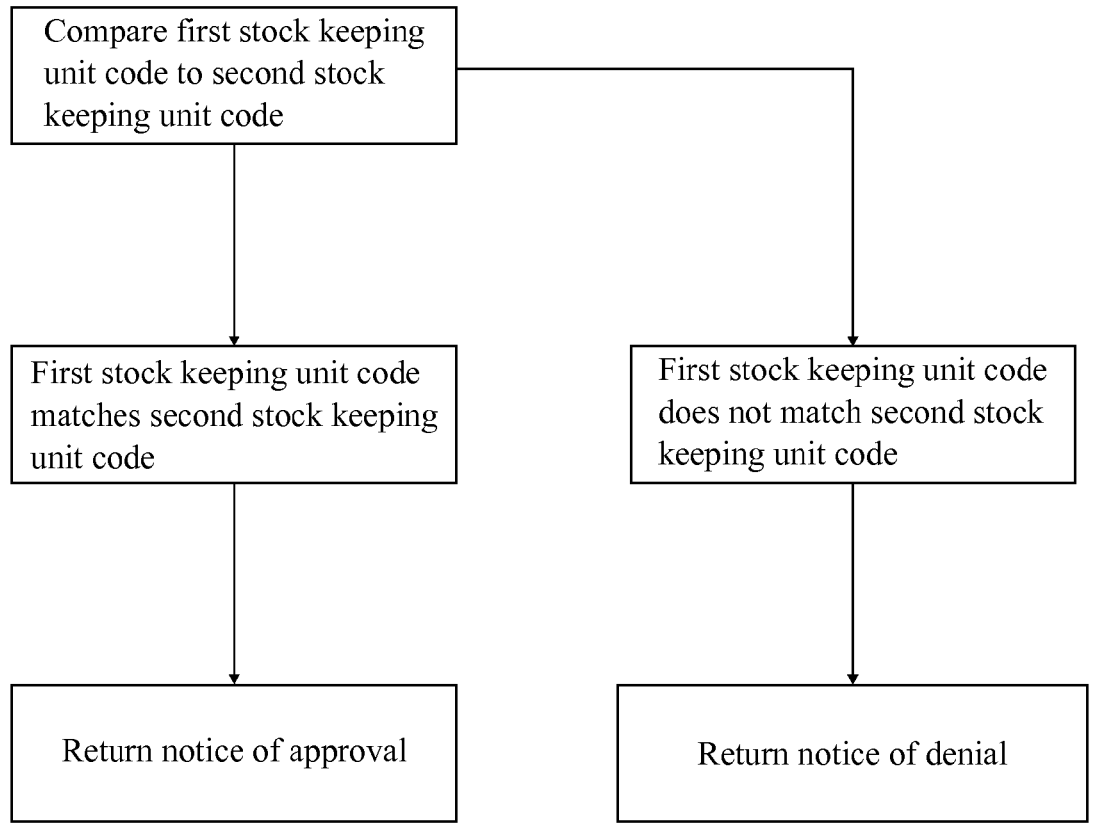
FIG. 8 is a flowchart further defining the process of comparing stock keeping unit codes, as related to the present invention.

The comparison between the first stock keeping unit code 71 and second stock keeping unit code 72 is made to ensure that the proper product is being returned, e.g. a consumer is returning the proper product that is tied with the first serial code 11. If the first stock keeping unit code 71 matches the second stock keeping unit code 72, then a notice of approval 51 is returned. However, if the first stock keeping unit code 71 does not match the second stock keeping unit code 72, then a notice of denial 52 is returned. In this manner the present invention ensures that, for example, the correct product is returned by the consumer. The steps related to the first stock keeping unit code 71 and second stock keeping unit code 72 are shown in FIG. 7 and FIG. 8. This process works in cooperation with other conditional logics disclosed.

Figure 9:
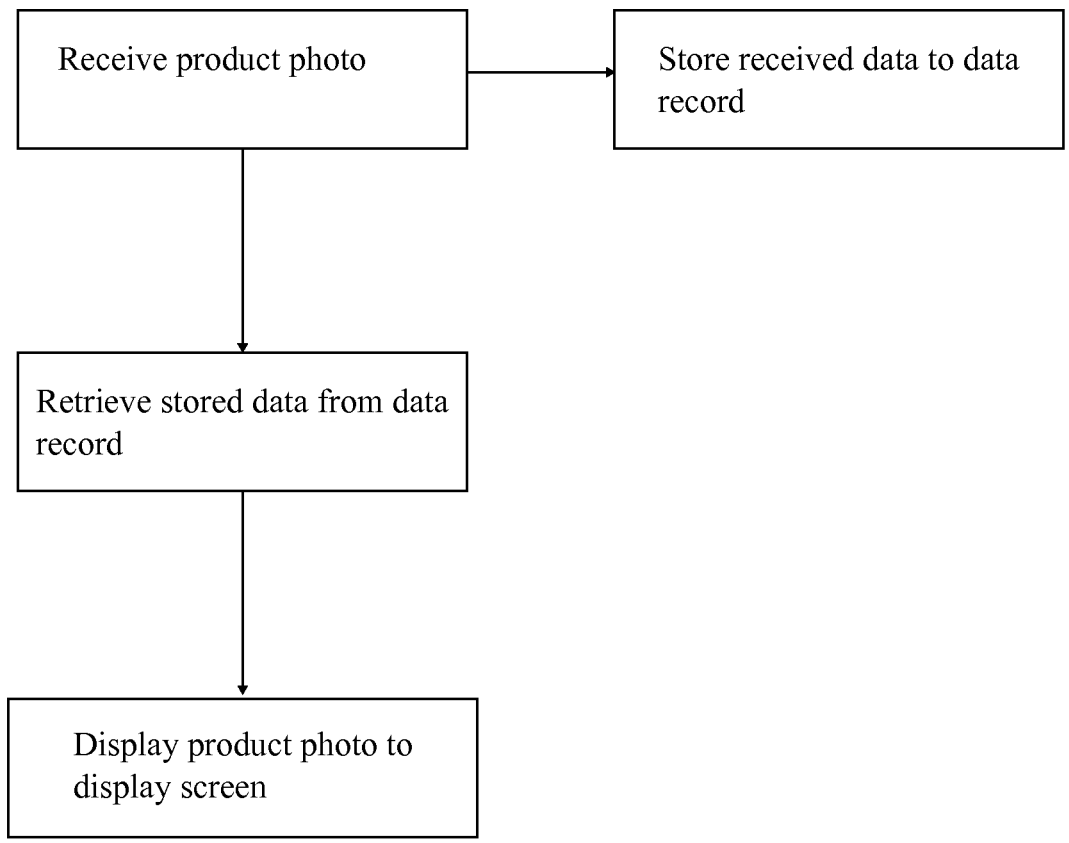
FIG. 9 is a flowchart detailing the process of receiving and displaying a product photo, as related to the present invention.

Another layer of security can be provided through a product photo 81. The product photo 81, taken before a product is transferred from one party to another (e.g. between a seller and a consumer), is received by the computer. The computer then stores the product photo 81 in the data record 31 along with the first serial code 11 and the first user identification 21. The data record 31 is then retrieved in order to access the product photo 81, with the product photo 81 being displayed through a display screen. The product photo 81 can thus be used as evidence that a product was not damaged prior to sale, protecting a seller against consumers who might try to return a product as broken after having damaged it themselves. FIG. 9 provides an outline of how the product photo 81 is integrated into the process of the present invention. This process works in cooperation with other conditional logics disclosed.

Figure 10:
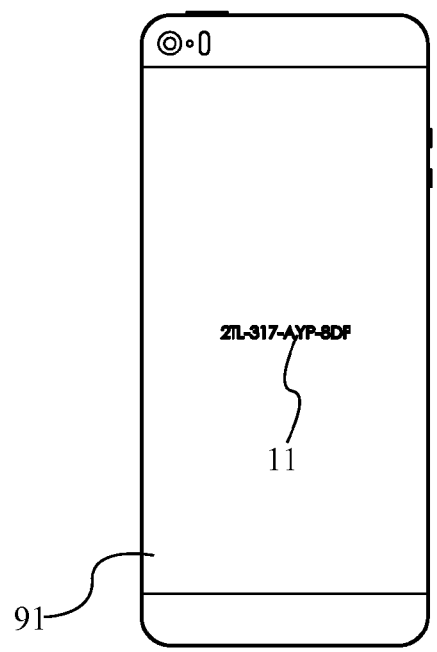
FIG. 10 is an illustration showing how serial codes may be directly integrated on a first product and a second product.
Figure 10:
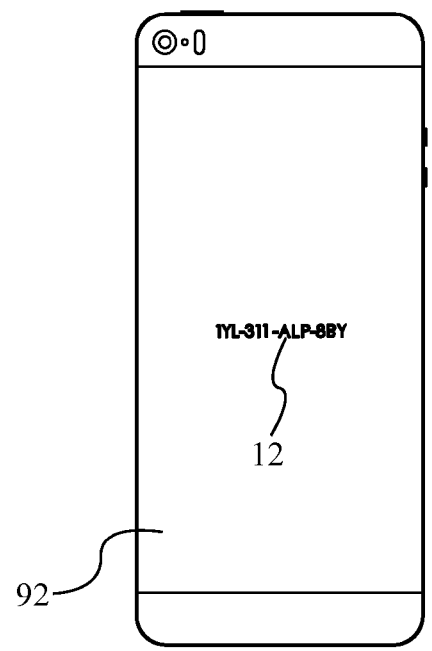
Figure 11:
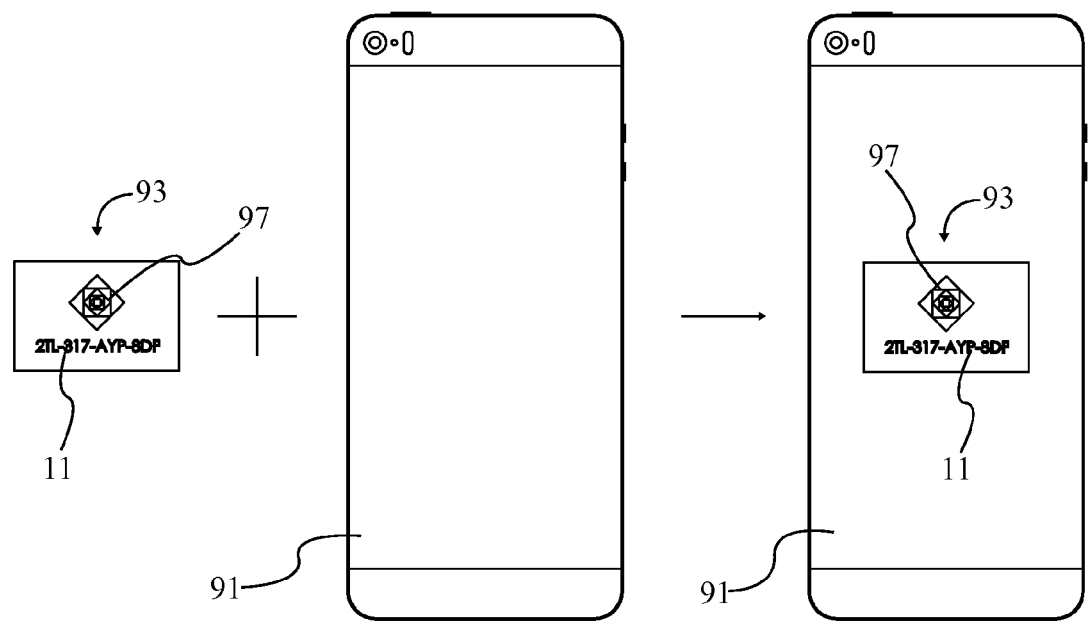
FIG. 11 is an illustration showing how serial codes may be integrated on tamper-evident stickers that are then placed on a first product and a second product.
Figure 11:
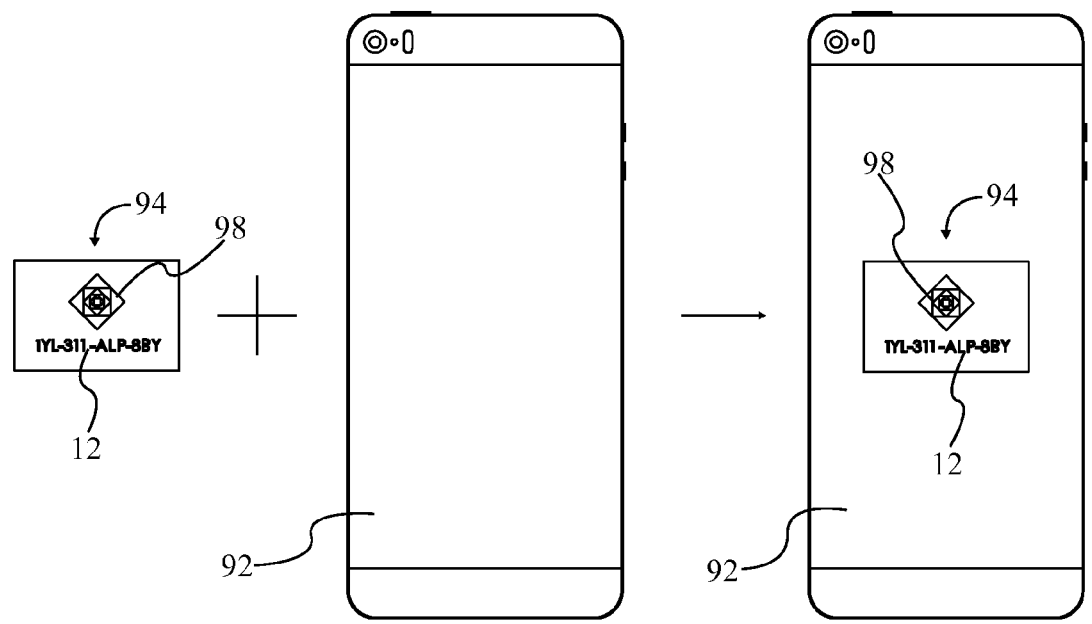

The serial code can be physically shown in a number of ways, including being directly integrated with a product (as illustrated in FIG. 10) or being printed on a sticker which is then attached to the product (as illustrated in FIG. 11). Elaborating upon the integration example, the first serial code 11 is integrated on the first product 91 while the second serial code 12 is integrated on the second product 92. Two examples of how the serial code might be integrated include engraving the serial codes on the products and printing the serial codes on the products.

Elaborating upon the sticker example, the first serial code 11 is printed on a first tamper evident sticker 93 while the second serial code 12 is printed on a second tamper evident sticker 94. The stickers themselves are applied to their respective products; the first tamper evident sticker 93 is integrated on the first product 91 while the second tamper evident sticker 94 is integrated on the second product 92. Using tamper evident stickers is advantageous in that an entity (e.g. a consumer) will not be able to tamper with a product without leaving evidence by means of the tamper evident sticker. This could be used to help protect sellers, with a notice of denial 52 being issues if evaluation of the tamper evident sticker shows signs of tampering. Such signs might be tears along the sticker, markings, or even adjacent adhesive residue (left on a product if a consumer tried to remove and then reapply the tamper evident sticker). It is noted that the tamper evident sticker itself is not the focus of the present invention, but rather a means of providing a first serial code 11 and second serial code 12 which can be captured from the tamper evident sticker and received by the computer of the present invention. The source from which the serial code is captured can thus be a, for example, a pre-etched serial code marked on the product or a serial code printed on the aforementioned tamper evident sticker. The use of the tamper evident sticker is not prevented in a case where a pre-etched serial code is integrated onto a product; if desired, a retailer may choose to apply the tamper evident sticker to the product and use the corresponding serial code in place of the pre-etched serial code.

Describing one example of how tampering may be shown by the tamper evident stickers, the tamper evident sticker is applied to the product in a manner that prevents accessing internal components of the product without disturbing the tamper evident sticker. For example, a personal computer might have the tamper evident sticker pressed over a removable panel that forms a case of the computer. Thus, in order to access and modify internal components of a computer (which some retailers define as voiding the warranty), a consumer would have to remove or damage the tamper evident sticker.

The actions of the consumer would result in a materially different sticker, clearly showing that a product has been tampered with, had internal components replaced, or is otherwise ineligible for a return. As mentioned, provided the sticker is applied over an opening, hatch, or similar feature of a product, it will be impossible for the consumer to open the product without affecting the sticker (e.g. tearing it in order to access a hatch or remove a panel) such that the sticker is materially different. In such a scenario the product is ineligible for return, even though the returned product has the same serial code originally store to the data file.

An additional layer of security can be integrated into the tamper evident sticker by providing an embedded radio-frequency identification (RFID) module in the tamper evident sticker. The serial code is stored in the RFID module, from which it can be obtained and supplied to the computer of the present invention. The RFID module stores the serial code in an encrypted data format to better protect against an unauthorized transaction.

Figure 12:
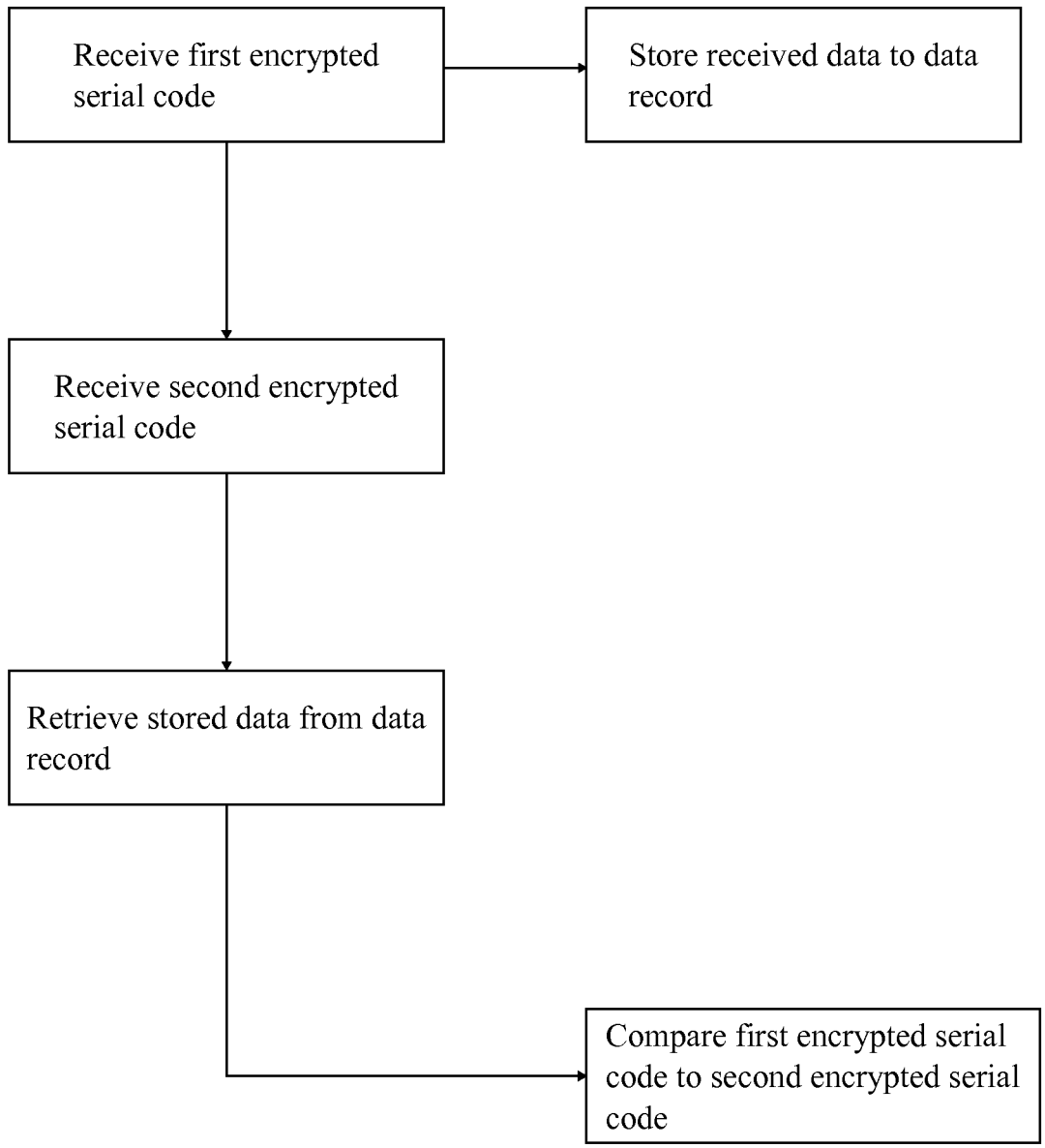
FIG. 12 is a flowchart illustrating the process of receiving and comparing encrypted serial codes, as related to the present invention.
Figure 13:
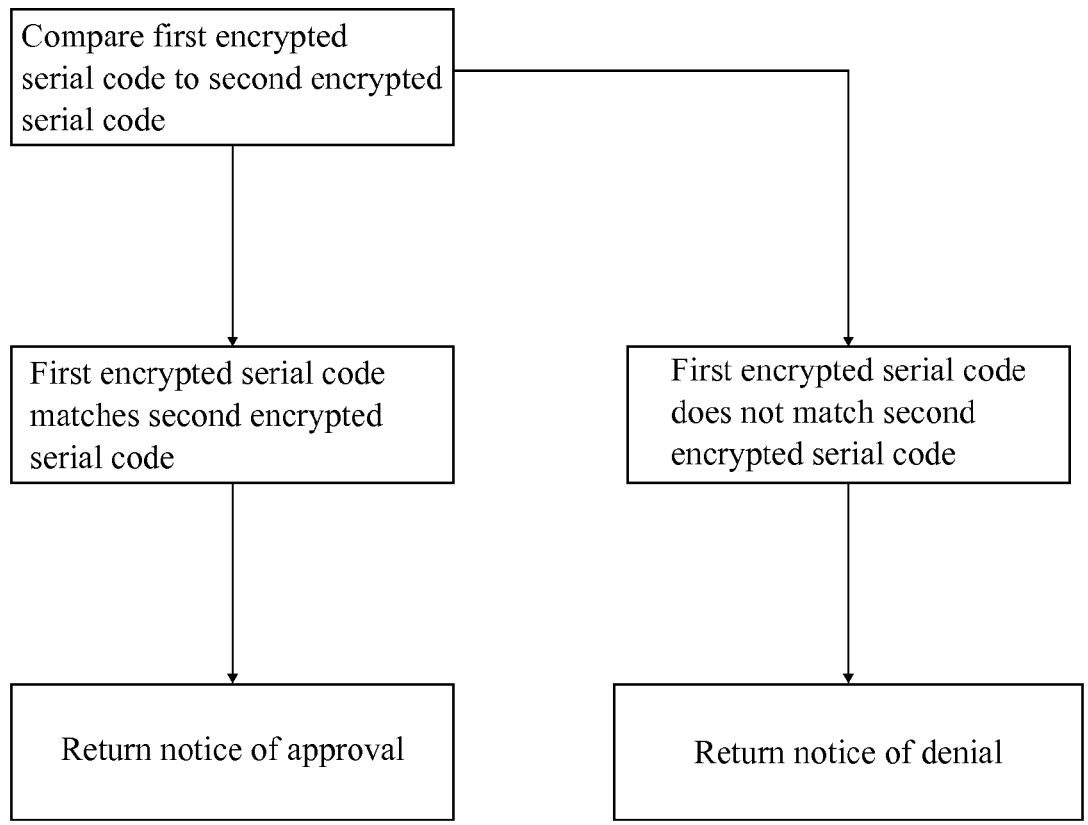
FIG. 13 is a flowchart further defining the process of comparing encrypted serial codes, as related to the present invention.

Initially, the computer receives the first encrypted serial code 95 which is stored in the data record 31. Eventually, the computer receives a second encrypted serial code 96, at which point the data record 31 is queried in order to retrieve the first encrypted serial code 95. A comparison can then be made between the first encrypted serial code 95 and the second encrypted serial code 96. The computer determines that a notice of approval 51 is to be issued if the first encrypted serial code 95 matches the second encrypted serial code. If, conversely, the first encrypted serial code 95 does not match the second encrypted serial code 96, the computer returns a notice of denial 52. A first RFID module 97, in which the first encrypted serial code 95 is stored, is embedded in the first tamper evident sticker 93. Likewise, a second RFID module 98, in which the second encrypted serial code is stored 96, is embedded in the second tamper evident sticker 94. The use of encrypted serial codes in this manner increases the effectiveness of the present invention in combating fraud, the application of these components with respect to the present invention being shown in FIG. 11, FIG. 12, and FIG. 13.

A further additional layer of security can be integrated into the tamper evident sticker by providing an embedded radio-frequency identification (RFID) module in the tamper evident sticker. The user identification is stored in the RFID module, from which it can be obtained and supplied to the computer of the present invention. The RFID module stores the user identification in an encrypted data format to better protect against an unauthorized transaction.

Figure 14:
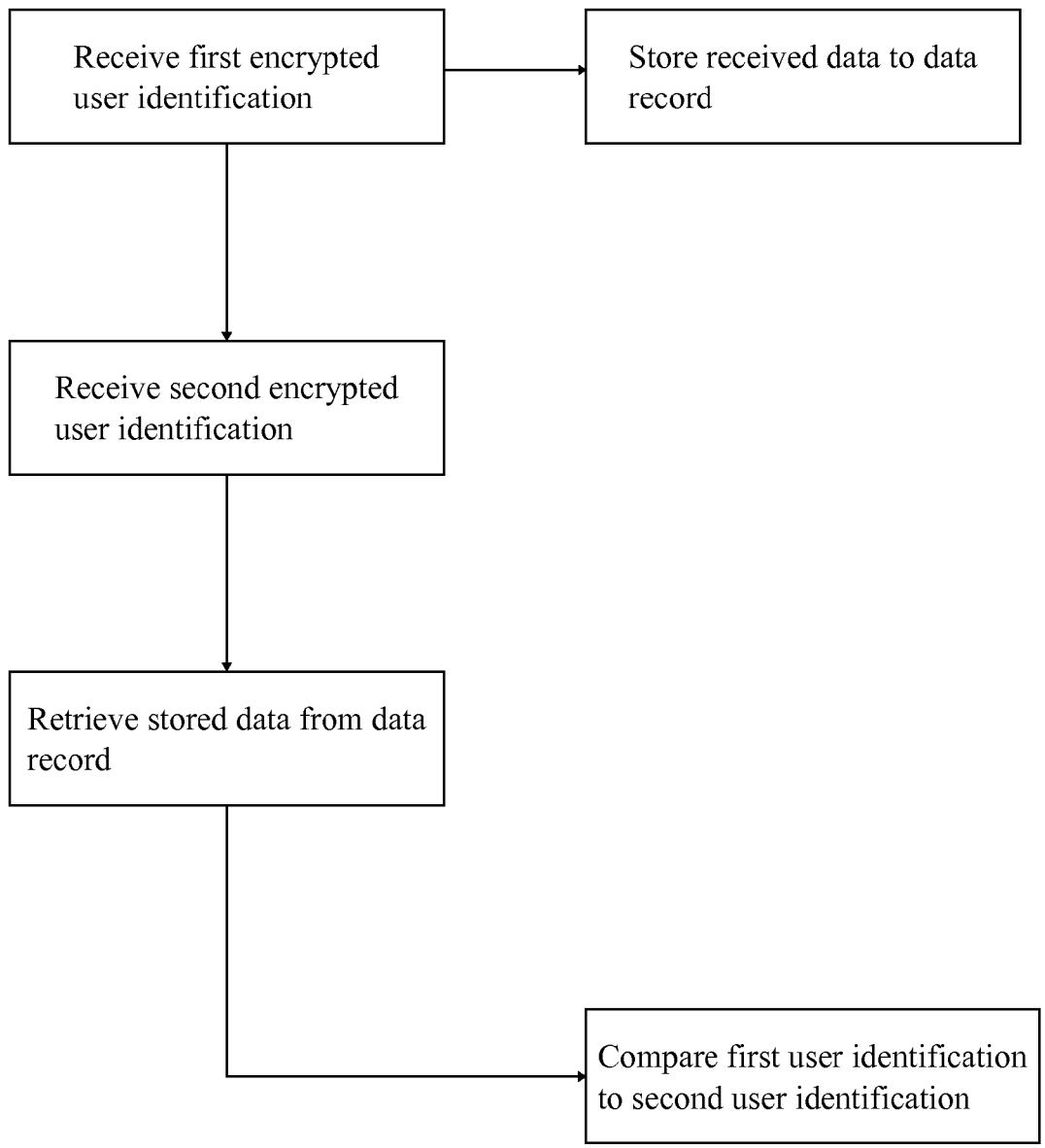
FIG. 14 is a flowchart illustrating the process of receiving and comparing encrypted user identifications, as related to the present invention.
Figure 15:
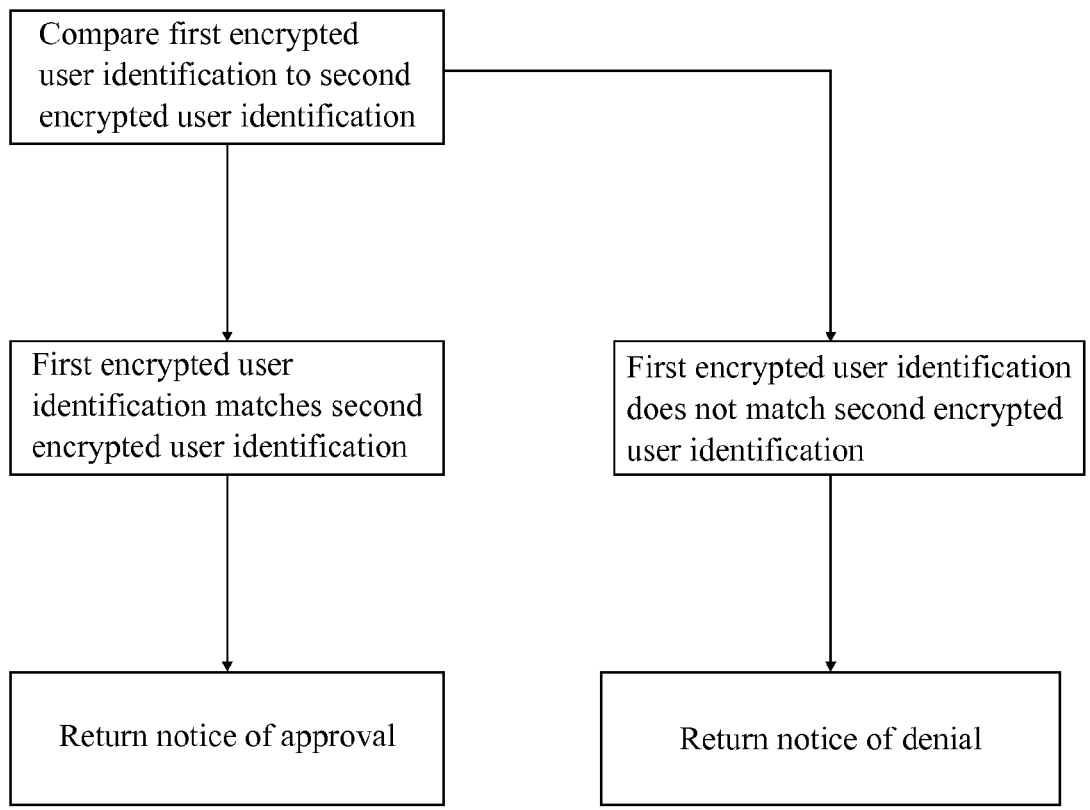
FIG. 15 is a flowchart further defining the process of comparing encrypted user identifications, as related to the present invention.

Initially, the computer receives the first encrypted user identification 99 which is stored in the data record 31. Eventually, the computer receives a second encrypted user identification 100, at which point the data record 31 is queried in order to retrieve the first encrypted user identification 99. A comparison can then be made between the first encrypted user identification 99 and the second encrypted user identification 100. The computer determines that a notice of approval 51 is to be issued if the first encrypted user identification 99 matches the second encrypted serial code. If, conversely, the first encrypted user identification 97 does not match the second encrypted user identification 100, the computer returns a notice of denial 52. A first RFID module 99, in which the first encrypted user identification 99 is stored, is embedded in the first tamper evident sticker 93. Likewise, a second RFID module 98, in which the second encrypted user identification is stored 100, is embedded in the second tamper evident sticker 94. The use of encrypted user identifications in this manner increases the effectiveness of the present invention in combating fraud, the application of these components with respect to the present invention being shown in FIG. 11, FIG. 14, and FIG. 15.

Potentially, a protective area of blank space is provided around the perimeter of the tamper evident sticker. This protective blank space reduces the chances of accidental smudging, scratching, or other damages occurring to the tamper evident sticker. A holographic image may also be incorporated into the tamper evident sticker.

Further possibilities for the tamper evident stickers include printing the serial code in a visible form and an invisible form, such as infrared ink. The provision of the invisible form allows for an additional comparison to be made by the present invention. This improves the tamper evident properties of the tamper evident stickers, since tampering could also be shown by comparing the visible serial code and invisible serial code.

Providing the serial code is printed twice, a properly equipped optical reader 41 could provide the computer with both a visible serial code and an invisible serial code. The computer could compare these two serial codes, issuing a notice of denial 52 if they don't match.

Returning to how the present invention can be implemented as an API or standalone software package, it can be provided through a number of platforms; examples of potential platforms include an online portal and an extension or similar add-on (e.g. an application created specifically for use with a smartphone or similar mobile device). A particular retailer can deploy the software for their own sellers' exclusive use on their own selling platform. Alternatively, the present invention software may be tied to multiple retail platforms, allowing a user to select which retail platform they wish to list a particular item for sale. Even more, the present invention may offer an API for third parties to integrate with. In such an implementation, third party developers may allow users to list items for sale which pass the data through the API to the present invention, which performs the aforementioned method steps before returning a notice of approval or denial to the final retail sales platform. These are just a few examples of platforms that can support the present invention, with other platforms being possible without departing from the scope of the present invention. The service offered by the present invention can be based off a number of fee structures, such as a recurring (e.g. "monthly") fee, an upfront purchase fee, or a combination thereof. Additionally, the service offered by the present invention, whether implemented through an API or software package, can be used to customize policies that better tailor the present invention to the requirements of individual retailers. An example of customizing a policy relates to the defined time period 63; different retailers often have different return policies. Often this is 30 days, as earlier referenced, but some retailers may choose to provide shorter or longer return periods as the defined time period 63. The customization aspect of the present invention allows different policies, as described, to be implemented according to the needs of individual retailers. Elaborating upon the previous example to show how multiple custom policies may be implemented, a customized policy may enforce different defined time periods 63 which are linked to different stock keeping unit codes. Effectively, this allows a retailer to customize return periods to types of products, e.g. electronics will have a longer return period than clothing. Ultimately, the present invention affords retailers the opportunity to customize the present invention as they deem is necessary.

Although the present invention has been explained in relation to its preferred embodiment, it is understood that many other possible modifications and variations can be made without departing from the spirit and scope of the present invention.

What is claimed is:

1. A method of comparing product-identifying serial codes by executing computer-executable instructions stored on a non-transitory computer-readable medium, comprising the steps of:

receiving a first serial code and a first user identification;
storing the first serial code and the first user identification in a data record;
receiving a second serial code and a second user identification;
retrieving the data record, wherein the data record having the first serial code and the first user identification;
comparing the first serial code to the second serial code;
comparing the first user identification to the second user identification;
returning a notice of approval, if the first serial code matches the second serial code;
returning a notice of denial, if the first serial code does not match the second serial code;
receiving a product photo;
storing the product photo in the data record; and
retrieving the data record, wherein the data record having the product photo.

2. The method as claimed in claim 1, further comprising:
returning a notice of approval,
if the first user identification does not match the second user identification;
returning the notice of approval,
if the first user identification matches the second user identification, and, the first serial code does not match the second serial code; and
returning a notice of denial,
if the first user identification matches the second user identification, and, the first serial code matches the second serial code.

3. The method as claimed in claim 2, further comprising:
receiving a first listing timestamp;
storing the first listing timestamp in the data record, wherein the data record having the first serial code and the first user identification;
receiving a second listing timestamp;
comparing the first listing timestamp to the second listing timestamp;
returning the notice of approval,
if the first user identification matches the second user identification, and, the first serial code matches the second serial code, and, the second listing timestamp is within a defined time period of the first timestamp; and
returning the notice of denial,
if the first user identification matches the second user identification, and, the first serial code matches the second serial code, and, the second listing timestamp is not within the defined time period of the first timestamp.

4. The method as claimed in claim 3, wherein:
the defined time period being variable.

5. The method as claimed in claim 1, wherein:
the first serial code and the first user identification is received from an optical reader;
the second serial code and the second user identification is received from the optical reader;
the first serial code and the first user identification being recognized by the optical reader through optical character recognition; and
the second serial code and the second user identification being recognized by the optical reader through optical character recognition.

6. The method as claimed in claim 1, wherein:
the first serial code being integrated on a first product; and
the second serial code being integrated on a second product.

7. The method as claimed in claim 1, wherein:
the first serial code being printed on a first tamper evident sticker;

the first tamper evident sticker being integrated on a first product;
the second serial code being printed on the second tamper evident sticker; and
the second tamper evident sticker being integrated on a second product.

8. The method as claimed in claim 7, further comprising:
receiving a first encrypted serial code;
storing the first encrypted serial code in the data record wherein the data record having the first serial code and the first user identification;
receiving a second encrypted serial code;
retrieving the data record, wherein the data record having the first encrypted serial code; and
comparing the first encrypted serial code to the second encrypted serial code.

9. The method as claimed in claim 8, further comprising:
returning a notice of approval,
if the first encrypted serial code matches the second encrypted serial code; and
returning a notice of denial,
if the first encrypted serial code does not match the second encrypted serial code.

10. The method as claimed in claim 8, wherein;
the first encrypted serial code being stored in a first radio-frequency identification (RFID) module;
the first RFID module being embedded in the first tamper evident sticker;
the second encrypted serial code being stored in a second RFID module; and
the second RFID module being embedded in the second tamper evident sticker.

11. The method as claimed in claim 7, further comprising:
receiving a first encrypted user identification;
storing the first encrypted user identification in the data record wherein the data record having the first serial code and the first user identification;
receiving a second encrypted user identification;
retrieving the data record, wherein the data record having the first encrypted user identification; and
comparing the first encrypted serial code to the second encrypted serial code.

12. The method as claimed in claim 11, further comprising:
returning a notice of approval,
if the first encrypted user identification matches the second encrypted user identification; and
returning a notice of denial,
if the first encrypted user identification does not match the second encrypted user identification.

13. The method as claimed in claim 11, wherein;
the first encrypted user identification being stored in a first radio-frequency identification (RFID) module;
the first RFID module being embedded in the first tamper evident sticker;
the second encrypted user identification being stored in a second RFID module; and
the second RFID module being embedded in the second tamper evident sticker.

14. The method as claimed in claim 1, further comprising:
receiving a first stock keeping unit code;
storing the first stock keeping unit code in the data record;
receiving a second stock keeping unit code;
retrieving the data record, wherein the data record having the first stock keeping unit code; and
comparing the first stock keeping unit code to the second stock keeping unit code.

15. The method as claimed in claim 14, further comprising:
returning the notice of approval,
if the first stock keeping unit code matches the second stock keeping unit code; and
returning the notice of denial,
if the first stock keeping unit code does not match the second stock keeping unit code.

16. The method as claimed in claim 1, further comprising:
displaying the product photo through a display screen.

* * * * *